United States Patent
Hirech et al.

(10) Patent No.: US 12,067,335 B2
(45) Date of Patent: Aug. 20, 2024

(54) AUTOMATIC CONFIGURATION OF PIPELINE MODULES IN AN ELECTRONICS SYSTEM

(71) Applicant: ARTERIS, INC., Campbell, CA (US)

(72) Inventors: Mokhtar Hirech, Sunnyvale, CA (US); Benoit de Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 193 days.

(21) Appl. No.: 17/717,133

(22) Filed: Apr. 11, 2022

(65) Prior Publication Data

US 2023/0325566 A1 Oct. 12, 2023

(51) Int. Cl.
*G06F 30/30* (2020.01)
*G06F 30/327* (2020.01)
*G06F 30/3312* (2020.01)
*G06F 30/337* (2020.01)
*G06F 119/12* (2020.01)

(52) U.S. Cl.
CPC ........ *G06F 30/327* (2020.01); *G06F 30/3312* (2020.01); *G06F 30/337* (2020.01); *G06F 2119/12* (2020.01)

(58) Field of Classification Search
None
See application file for complete search history.

(56) References Cited

U.S. PATENT DOCUMENTS

| | | |
|---|---|---|
| 5,485,396 A | 1/1996 | Brasen et al. |
| 5,541,849 A | 7/1996 | Rostoker et al. |
| 5,623,420 A | 4/1997 | Yee et al. |
| 5,638,288 A | 6/1997 | Deeley |
| 5,761,078 A | 6/1998 | Fuller et al. |
| 5,887,670 A | 3/1999 | Tabata et al. |
| 5,903,886 A | 5/1999 | Heimlich et al. |
| 5,983,277 A | 11/1999 | Heile et al. |
| 6,002,857 A | 12/1999 | Ramachandran |
| 6,134,705 A | 10/2000 | Pedersen et al. |
| 6,145,117 A | 11/2000 | Eng |

(Continued)

FOREIGN PATENT DOCUMENTS

| | | |
|---|---|---|
| CN | 105187313 B | 5/2018 |
| CN | 109587081 A | 4/2019 |

(Continued)

OTHER PUBLICATIONS

Anonymous: "Intel Hyperflex Architecture HighPerformance Design Handbook", Oct. 4, 2021 (Oct. 4, 2021), pp. 1-147, XP093063924, Retrieved from the Internet: URL:https://cdrdv2.intel.com/vl/dl/getContent/667078?fileName=sl0_hp_hb-683353-667078.pdf.

(Continued)

*Primary Examiner* — Leigh M Garbowski
(74) *Attorney, Agent, or Firm* — Jubin Dana; Dana Legal Services

(57) ABSTRACT

Generation of a full register-transfer level (RTL) description of an electronics system includes generating an optimized pipeline configuration from inputs including a database of RTL elements, and a list of configurable pipeline components; and generating the full RTL description with the pipeline components configured according to the optimized pipeline configuration. Generating the configuration includes performing a search for a configuration that optimizes area and timing.

19 Claims, 11 Drawing Sheets

Generate optimized pipeline configuration, including performing a search for a configuration that optimizes area and timing — 100

Generate a full RTL description with the optimized pipeline configuration — 110

(56) References Cited

U.S. PATENT DOCUMENTS

| | | |
|---|---|---|
| 6,249,902 B1 | 6/2001 | Igusa et al. |
| 6,321,363 B1 | 11/2001 | Huang et al. |
| 6,360,356 B1 | 3/2002 | Eng |
| 6,378,121 B2 | 4/2002 | Hiraga |
| 6,421,321 B1 | 7/2002 | Sakagawa et al. |
| 6,437,804 B1 | 8/2002 | Ibe et al. |
| 6,449,761 B1 | 9/2002 | Greidinger et al. |
| 6,622,225 B1 | 9/2003 | Kessler et al. |
| 6,883,455 B2 | 4/2005 | Maeda et al. |
| 6,907,591 B1 | 6/2005 | Teig et al. |
| 7,096,436 B2 | 8/2006 | Bednar et al. |
| 7,398,497 B2 | 7/2008 | Sato et al. |
| 7,587,687 B2 | 9/2009 | Watanabe et al. |
| 7,788,625 B1 | 8/2010 | Donlin et al. |
| 8,042,087 B2 | 10/2011 | Murali et al. |
| 8,302,041 B1 | 10/2012 | Chan et al. |
| 8,806,410 B2 * | 8/2014 | Kumar ............... G06F 30/396 716/120 |
| 8,819,611 B2 | 8/2014 | Philip et al. |
| 9,184,998 B2 | 11/2015 | Xue |
| 9,251,300 B2 * | 2/2016 | Hutton ............... G06F 30/327 |
| 9,262,359 B1 | 2/2016 | Noice et al. |
| 9,444,702 B1 | 9/2016 | Raponi et al. |
| 9,569,574 B1 | 2/2017 | Khan et al. |
| 9,792,397 B1 | 10/2017 | Nagaraja |
| 9,825,779 B2 | 11/2017 | Ruymbeke et al. |
| 9,940,423 B2 | 4/2018 | Lescure |
| 10,068,047 B1 | 9/2018 | Finn |
| 10,089,426 B2 * | 10/2018 | Isshiki ............... G06F 30/327 |
| 10,282,502 B1 | 5/2019 | BShara et al. |
| 10,348,563 B2 | 7/2019 | Rao et al. |
| 10,460,062 B2 | 10/2019 | Feld et al. |
| 10,657,210 B2 * | 5/2020 | Etscheid ............... G06F 1/08 |
| 10,733,350 B1 | 8/2020 | Prasad et al. |
| 10,853,545 B1 | 12/2020 | Nardi et al. |
| 10,922,471 B2 | 2/2021 | Baeckler et al. |
| 10,990,724 B1 | 4/2021 | Cherif et al. |
| 11,121,933 B2 | 9/2021 | Cherif et al. |
| 11,281,827 B1 * | 3/2022 | Labib ............... G06F 30/31 |
| 11,449,655 B2 | 9/2022 | Cherif et al. |
| 11,675,942 B2 * | 6/2023 | Angiolini ............... G06F 30/31 716/112 |
| 2003/0093765 A1 | 5/2003 | Lam et al. |
| 2004/0040007 A1 | 2/2004 | Harn |
| 2004/0230919 A1 | 11/2004 | Balasubramanian et al. |
| 2005/0073316 A1 | 4/2005 | Graham |
| 2005/0268258 A1 | 12/2005 | Decker |
| 2007/0156378 A1 | 7/2007 | McNamara |
| 2007/0157131 A1 | 7/2007 | Watanabe et al. |
| 2007/0174795 A1 | 7/2007 | Lavagno et al. |
| 2007/0186018 A1 | 8/2007 | Radulescu et al. |
| 2008/0046854 A1 | 2/2008 | Tang |
| 2008/0049753 A1 | 2/2008 | Heinze et al. |
| 2008/0279183 A1 | 11/2008 | Wiley et al. |
| 2008/0291826 A1 | 11/2008 | Licardie et al. |
| 2009/0031277 A1 | 1/2009 | Mcelvain et al. |
| 2009/0313592 A1 | 12/2009 | Murali et al. |
| 2010/0061352 A1 | 3/2010 | Fasolo et al. |
| 2010/0162189 A1 | 6/2010 | Lavagno et al. |
| 2010/0218146 A1 | 8/2010 | Platzker et al. |
| 2010/0274785 A1 | 10/2010 | Procopiuc et al. |
| 2011/0170406 A1 | 7/2011 | Krishnaswamy |
| 2012/0013509 A1 | 1/2012 | Wisherd et al. |
| 2012/0311512 A1 | 12/2012 | Michel et al. |
| 2013/0174113 A1 | 7/2013 | Lecler et al. |
| 2013/0208598 A1 | 8/2013 | Nakaya et al. |
| 2013/0258847 A1 | 10/2013 | Zhang et al. |
| 2013/0283226 A1 | 10/2013 | Ho et al. |
| 2013/0346929 A1 * | 12/2013 | Toi ............... G06F 30/327 716/104 |
| 2014/0115218 A1 | 4/2014 | Philip et al. |
| 2014/0126572 A1 | 5/2014 | Hutton et al. |
| 2014/0153575 A1 | 6/2014 | Munoz |
| 2014/0156826 A1 | 6/2014 | Chang et al. |
| 2014/0160939 A1 | 6/2014 | Arad et al. |
| 2014/0169173 A1 | 6/2014 | Naouri et al. |
| 2014/0204735 A1 | 7/2014 | Kumar et al. |
| 2014/0211622 A1 | 7/2014 | Kumar et al. |
| 2014/0298281 A1 | 10/2014 | Varadarajan et al. |
| 2014/0321839 A1 | 10/2014 | Armstrong |
| 2015/0036536 A1 | 2/2015 | Kumar et al. |
| 2015/0106778 A1 | 4/2015 | Mangano et al. |
| 2015/0121319 A1 | 4/2015 | Hutton et al. |
| 2015/0178435 A1 | 6/2015 | Kumar |
| 2015/0254325 A1 | 9/2015 | Stringham |
| 2015/0341224 A1 | 11/2015 | Van et al. |
| 2015/0347641 A1 | 12/2015 | Gristede et al. |
| 2016/0103943 A1 | 4/2016 | Xia et al. |
| 2016/0275213 A1 | 9/2016 | Tomita |
| 2016/0321390 A1 | 11/2016 | Bozman et al. |
| 2017/0060204 A1 | 3/2017 | Gangwar et al. |
| 2017/0063734 A1 | 3/2017 | Kumar |
| 2017/0132350 A1 | 5/2017 | Janac |
| 2017/0177778 A1 | 6/2017 | Lescure |
| 2017/0193136 A1 | 7/2017 | Prasad et al. |
| 2018/0115487 A1 | 4/2018 | Thubert et al. |
| 2018/0144071 A1 | 5/2018 | Yu et al. |
| 2018/0227180 A1 | 8/2018 | Rao et al. |
| 2019/0012909 A1 | 1/2019 | Mintz |
| 2019/0073440 A1 | 3/2019 | Farbiz et al. |
| 2019/0205493 A1 | 7/2019 | Garibay et al. |
| 2019/0246989 A1 | 8/2019 | Genov et al. |
| 2019/0251227 A1 | 8/2019 | Fink |
| 2019/0260504 A1 | 8/2019 | Philip et al. |
| 2019/0363789 A1 | 11/2019 | Lee et al. |
| 2020/0092230 A1 | 3/2020 | Schultz et al. |
| 2020/0133980 A1 * | 4/2020 | Alcorn ............... G06N 3/063 |
| 2020/0162335 A1 | 5/2020 | Chen et al. |
| 2020/0234582 A1 | 7/2020 | Mintz |
| 2020/0366607 A1 | 11/2020 | Kommula et al. |
| 2021/0203557 A1 | 7/2021 | Cherif et al. |
| 2021/0226887 A1 | 7/2021 | Mereddy |
| 2021/0320869 A1 | 10/2021 | Bourai et al. |
| 2021/0409284 A1 | 12/2021 | Cherif et al. |
| 2022/0294704 A1 | 9/2022 | Lescure et al. |

FOREIGN PATENT DOCUMENTS

| | | |
|---|---|---|
| CN | 113051215 A | 6/2021 |
| CN | 113055219 A | 6/2021 |
| DE | 102015014851 A1 | 5/2016 |
| EP | 3842987 A1 | 6/2021 |
| EP | 4024262 A1 | 7/2022 |
| EP | 4057179 A1 | 9/2022 |

OTHER PUBLICATIONS

James C. Tiernan. 1970. An efficient search algorithm to find the elementary circuits of a graph. Commun. ACM 13, 12 (Dec. 1970), 722-726. https://doi.org/10.1145/362814.362819.

Ken Eguro et al: "Simultaneous Retiming and Placement for Pipelined Net lists", Proceedings of the 16th International Symposium On Field-Programmable Custom Computing Machines, Apr. 14, 2008 (Apr. 14, 2008), pp. 139-148, XP031379339.

U.S. Appl. No. 17/134,384, filed Dec. 26, 2020, Federico Angiolini.

U.S. Appl. No. 17/665,578, filed Feb. 6, 2022, K. Charles Janac.

"a distributed interleaving scheme for efficient access to wideIO dram memory", Seiculescu Ciprian, Benini Luca, De Micheli Giovanni, CODES+ISSS'12 (Year: 2012).

"Thread-Fair Memory Request Reordering"; Kun Fang, Nick Iliev, Ehsan Noohi, Suyu Zhang, and Zhichun Zhu; Dept. of ECE, Univeristy of Illinois at Chicago; JWAC-3 Jun. 9, 2012.

19th Asia and South Pacific Design Automation Conterence Alberto Ghiribaldi, Hervé Tatenguem Fankem, Federico Angiolini, Mikkel Stensgaard, Tobias Bjerregaard, Davide Bertozzi A Vertically Integrated and Interoperable Multi-Vendor Synthesis Flow for Predictable NoC Design in Nanoscale Technologies.

ACM ICCAD '06 Srinivasan Murali, Paolo Meloni, Federico Angiolini, David Atienza, Salvatore Carta, Luca Benini, Giovanni De Micheli, Luigi Raffo Designing Application-Specific Networks on Chips with Floorplan Information p. 8, Figure 8.

(56) References Cited

OTHER PUBLICATIONS

Annual IEEE International SoC Conference Proceedings Mohammad reza Kakoee, Federico Angiolin, Srinivasan Murali, Antonio Pullini, Ciprian Seiculescu, and Luca Benini A Floorplan-aware Interactive Tool Flow for NoC Design and Synthesis pp. 1, 2, 4 2009 Belfast, Northern Ireland, UK.
Anonymous: "Network on a chip—Wikipedia", Jun. 15, 2021, https://en.wikipedia.org/w/index php?title-Network_on_a_chip&oldid-1028654828.
Haytham Elmiligi et al: "Networks-on-chip topology optimization subject to power, delay, and reliability constraints", IEEE International Symposium On Circuits and Systems, May 30, 2010, pp. 2354-2357, DOI: 10.1109/ISCAS 2010.5537194.
Jain R. et al. "Predicting system-level area and delay for pipelined and nonpipelined designs", IEEE Transactions On Computer Aided Design of Integrated Circuits and Systems, vol. 11, No. 8, Jan. 1, 1992, pp. 955-965, DOI: 10, 1109/43. 149767.
Jingye Xu et al: "Latch Based Interconnect Pipelining For High Speed Integrated Circuits", Proceedings of the International Conference On Electro/Information Technology, May 1, 2006, pp. 295-300 DOI: 10.1109/EIT 2006.252152.
Jun Minje et al: "Exploiting Implementation Diversity and Partial Connection of Routers in Application-Specific Network-on-Chip Topology Synthesis", IEEE Transactions On Computers, IEEE, USA, vol. 63, No. 6, Jun. 1, 2014 (Jun. 1, 2014), pp. 1434-1445, XP011550397, ISSN: 0018-9340, DOI: 10,1109/TC.2012.294.
Saponara S et al: "Design and coverage-driven verification of a novel network-interface IP macrocell for network-on-chip interconnects", Microprocessors and Microsystems, vol. 35, No. 6 , pp. 579-592, XP028255708 ISSN: 0141-9331, DOI: 10.1016/J.MICROPRO. 2011.06.005.
Saponara Sergio et al: "Configurable network-on-chip router macrocells", Microprocessors and Microsystems, IPC Business Press Ltd. London, GB, vol. 45, Apr. 29, 2016 (Apr. 29, 2016), pp. 141-150 XP029678799, ISSN: 0141-9331, DOI: 10.1016/J.MICPRO. 2016.04.008.
Song Z et al: "A NOC-Based High Performance Deadlock Avoidance Routing Algorithm", Computer and Computational Sciences, 2008. IMSCCS '08. International Multisymposiums On, IEEE, Piscataway, NJ, USA, Oct. 18, 2008, pp. 140-143, XP031411025, ISBN: 978-0-7695-3430-5.
Dumitriu Vet Al: "Throughput-Oriented Noc Topology Generation and Analysis for High Performance SoCs", IEEE Transactions On Very Large Scale Integration (VLSI) Systems, IEEE Service Center, Piscataway, NJ, USA, vol. 17, No. 10, Oct. 1, 2009 (Oct. 1, 2009), pp. 1433-1446, XP011267808, ISSN: 1063-8210, DOI: 10.1109/TVLSI.2008.2004592.
Fangfa Fu et al: "A Noc performance evaluation platform supporting designs at multiple levels of abstraction", Industrial Electronics and Applications, 2009. ICIEA 2009. 4th IEEE Conference On, IEEE, Piscataway, NJ, USA, May 25, 2009 (May 25, 2009), pp. 425-429, XP031482069, ISBN: 978-1-4244-2799-4 *abstract* * p. 426-p. 429 *.
Murali et al: "Synthesis of Predictable Networks-on-Chip-Based Interconnect Architectures for Chip Multiprocessors", IEEE Transactions On Very Large Scale Integration (VLSI) Systems, IEEE Service Center, Piscataway, NJ, USA, vol. 15, No. 8, Aug. 1, 2007 (Aug. 1, 2007) , pp. 869-880, XP011187732, ISSN: 1063-8210, DOI: 10.1109/TVLSI.2007.900742.
Picornell Tomas Tompic@Gap.Upv.Es et "DCFNoC A Delayed Conflict-Free Time Division Multiplexing Network on Chip", Designing Interactive Systems Conference, ACM, 2 Penn Plaza, Suite 701 New York NY10121-0701 USA, Jun. 2, 2019 (Jun. 2, 2019), pp. 1-6, XP058637807, DOI: 10.1145/3316781.3317794 ISBN: 978-1-4503-5850-7.
Alessandro Pinto et al., "System level design paradigms", ACM Transactions On Design Automation of Electronic Systems, ACM, New York, NY, US, (Jun. 7, 2004), vol. 11, No. 3, doi:10.1145/1142980.1142982, ISSN 1084-4309, pp. 537-563, XP058222500.
Bo Huang et al., "Application-Specific Network-on-Chip synthesis with topology-aware floorplanning", Integrated Circuits and Systems Design (SBCCI), 2012 25th Symposium On, IEEE, (Aug. 30, 2012), doi:10.1109/SBCCI.2012.6344421, ISBN 978-1-4673-2606-3, pp. 1-6, XP032471227.
David Atienza et al., Network-on-Chip Design and Synthesis Outlook, Science Direct, Integration the VLSI, journal 41 (2008) 340-359.
Jean-Jacques Lecler et al:Application driven network-on-chip architecture exploration & refinement for a complex SoC, Design Automation for Embedded Systems, vol. 15 No. 2, Apr. 7, 2011, DOI: 10.1007/S10617-011-9075-5.
K. R. Manik et al., "Methodology for Design of Optimum NOC Based on I PG," 2017 Int'l Conference on Algorithms, Methodology, Model and Applications in Emerging Technologies (ICAMMAET), Chennai, India, IEEE, 6 pages. (Year: 2017).
Luca Benini: "Application specific Noc design", Design, Automation and Test in Europe, 2006, Date '06 : Mar. 6-10, 2006, [Munich, Germany; Proceedings] / [Sponsored By the European Design and Automation Association], IEEE, Piscataway, NJ, USA, Mar. 6, 2006 (Mar. 6, 2006), pp. 491-495, XP058393584, ISBN: 9783981080100.
Partha et al., Design, Synthesis, and Test of Networks on Chips, IEEE (Year: 2005).
Srinivasan K et al, "Linear programming based techniques for synthesis of network-on-chip architectures", Computer Design: VLSI in Computers and Processors, 2004. ICCD 2004. Proceedings. IEEE International Conference On San Jose, CA, USA Oct. 11-13, 2004, Piscataway, NJ, USA, IEEE, (Jan. 11, 2004), doi:10.1109/ICCD.2004.1347957, Isbn 978-0-7695-2231-9, pp. 422-429, XP010736641.
Srinivasan Murali et al: "Mapping and physical planning of networks-on-chip architectures with quality-of-service guarantees", Proceedings of The 2005 Asia and South Pacific Design Automation Conference, Jan. 18, 2005, DOI: 10.1145/1120725.1120737.
Tobias Bjerregaard et al: "A Router Architecture for Connection-Oriented Service Guarantees in the MANGO Clockless Network-on-Chip", Proceedings of the IEEE Conference and Exhibition On Design, Automation, and Test in Europe, Mar. 7, 2005, Doi: 10.1109/DATE.2005.36.
Wei Zhong et al: "Floorplanning and Topology Synthesis for Application-Specific Network-on-Chips", IEICE Transactions On Fundamentals of Electronics< Communications and Computer Sciences, Jun. 1, 2013, DOI: 10.1587/TRANSFUN.E96.A.1174.
Zhou Rongrong et al: A Network Components Insertion Method for 3D Application-Specific Network-on-Chip, Proceedings of the 11TH IEEE International Conference On Asic, Nov. 3, 2015, pp. 1-4, Diu: 10.1109/ASICON.2015.7516952.
Francesco Robino: "A model-based design approach for heterogeneous NoC-based MPSoCs on FPGA", Jul. 1, 2014 (Jul. 1, 2014), XP002806918, Retrieved from the Internet: URL: http://www.divaportal.org/smash/get/diva2:718518/FULLTEXT02.pdf [retrieved on Jun. 22, 2022].
Chaari Moomen Moomen Chaari@Infineon Com et al: "A model-based and simulation-assisted FMEDA approach for safety-relevant E/E systems", Proceedings of the 34th ACM SIGMOD-SIGACT-SIGAI Symposium On Principles of Database Systems, ACMPUB27, New York, NY, USA, Jun. 7, 2015 (Jun. 7, 2015), pp. 1-6, XP058511366, DOI: 10.1145/2744769.2747908 ISBN: 978-1-4503-3550-8.
Mariani R et al: "Fault-Robust Microcontrollers for Automotive Applications", On-Line Testing Symposium, 2006. IOLTS 2006. 12th IEEE International Como, Italy Jul. 10-12, 2006, Piscataway, NJ, USA, IEEE, Jul. 10, 2006 (Jul. 10, 2006), pp. 213-218, XP010928275, DOI: 10.1109/IOLTS.2006.38 ISBN: 978-0-7695-2620-1.

\* cited by examiner

AUTOMATIC CONFIGURATION OF PIPELINE MODULES IN AN ELECTRONICS SYSTEM

FIELD OF THE INVENTION

The invention relates generally to electronic systems design and, more specifically, to automatic optimization of pipeline configuration.

BACKGROUND

Register Transfer Level (RTL) typically refers to a design abstraction that models a digital circuit as the flow of data signals between hardware registers, and the logical operations that are performed on those signals. That is, it describes how data is manipulated and moved among registers. RTL may be used for design and verification flow of electronic systems. For instance, RTL may be used for design and verification flow of a system on a chip (SoC).

Conventional RTL generation for an SoC is particularly time consuming for a system making use of reconfigurable and parametrizable hardware components. For instance, an initial RTL description is generated and sent to an SoC integrator to determine whether certain constraints are satisfied. If any constraints are violated, a new RTL description is generated, and verification is repeated. Multiple iterations can take hours to perform. The challenge or issue is not just about the time it takes to generate RTL, but the time to generate the final acceptable RTL. Today, the designer or user manually creates configuration for pipeline modules and generates the RTL. Any issues with the configuration setting won't be seen until later in the synthesis flow when timing and/or area criteria/constraints are not met. This causes the user to go back (pricy iteration) to change the pipeline configuration again, and keep trying this process until it works. Therefore, what is needed is a system and method for automatically configuring pipeline modules in an electronic system.

SUMMARY

Various embodiments and methods are disclosed that automatically configure pipeline modules in an electronic system. The method, as implemented by the embodiments of the invention, includes generation of a full register-transfer level (RTL) description of an electronics system. The method includes generating an optimized pipeline configuration from inputs including a database of RTL elements, and a list of configurable pipeline components; and generating the full RTL description with the pipeline components configured according to the optimized pipeline configuration. Generating the configuration includes performing a search for a configuration that optimizes area and timing. Various advantages result from the embodiments and methods in accordance with the present invention, as disclosed herein. Additionally, the method disclosed herein is generic and is not limited to where the pipeline belongs to or is located.

BRIEF DESCRIPTION OF THE DRAWINGS

In order to understand the invention more fully, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and the presently understood best mode of the invention are described with additional detail through use of the accompanying drawings.

DETAILED DESCRIPTION

Figure 1:
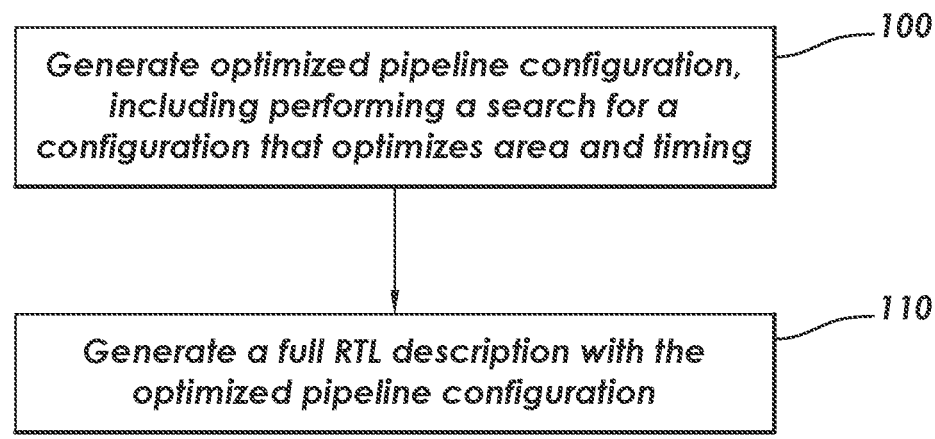
FIG. 1 shows a computer-implemented method of generating an RTL description of an electronics system in accordance with the various aspects and embodiment of the invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention(s) is defined only by the appended claims, along with the full scope of equivalents to which such claims are entitled.

Reference throughout this specification to "one embodiment," "an embodiment," "one example," or "an example" means that a particular feature, structure, or characteristic described in connection with the embodiment or example is included in at least one embodiment of the invention. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

As used herein, a "source," a "master," and an "initiator" refer to similar intellectual property (IP) blocks, modules, or units; the terms are used interchangeably within the scope and embodiments of the invention. As used herein, a "sink," a "slave," and a "target" refer to similar IP modules or units and the terms are used interchangeably within the scope and embodiments of the invention. As used herein, a transaction may be a request transaction or a response transaction. Examples of request transactions include write request and read request.

The flowchart and block diagrams in the attached figures illustrate the architecture, functionality, and operation of possible implementations of systems, methods, and computer program products according to various embodiments of the invention. In this regard, each step in the flowchart or block diagrams may represent a module, segment, or portion of code, which comprises one or more executable instructions for implementing the specified logical function(s). It will also be noted that each step of the block diagrams and/or flowchart illustrations, and combinations of steps or blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram steps or blocks.

Reference is made to FIG. 1, which illustrates a computer-implemented method of generating a full RTL description of an electronics system. The electronics system makes use of reconfigurable and/or parametrizable hardware blocks. In FIG. 1, the blocks include reconfigurable pipeline components. Examples of the electronics system include, but are not limited to, artificial intelligence (AI), SoC, and system-in-package (SiP).

At step 100, an "optimized" pipeline configuration is generated. The optimized configuration is generated from inputs including a database of RTL elements and a list of the reconfigurable and/or parametrizable hardware components. The list of configurable pipeline elements identifies different configuration modes for each of the pipeline elements. The list refers to the target pipeline instances in the system being designed. In accordance with some aspect and embodiments of the invention, the target list could include all the possible pipeline instances or just a subset of instances that reside within some specific sub-systems. Logical operations and timing path information is known for each configuration mode. The terms "timing path" and "timing arc" are related in that a timing arc is one of the components of a timing path. The timing arcs refer to paths between ports of same library component. Timing paths for paths that cross multiple instances of library components.

Generating the optimized configuration includes performing a search for a configuration that optimizes area and timing. In accordance with some aspect and embodiments of the invention, the process prioritize timing over area. In the search, the process reduces the number of registers (hence save area) as long as the timing constraint is met. The process stops reducing the relaxation on a path when it hits a configuration of pipelines on the path that leads to timing violation and uses the last configuration without violation. Thus, in accordance with some aspect and embodiments of the invention, some optimized configurations are not necessarily optimal, nor is it necessarily the only possible configuration. There might be multiple configurations that satisfy both timing and area constraints. However, search quickly finds a configuration that strikes a balance between timing and area.

At step 110, a full RTL description is generated with the pipeline components configured according to the optimized pipeline configuration. As used herein, the full RTL description refers to an RTL description that is synthesized exactly from a very large library of primitives. The method of FIG. 1 has several advantages over a conventional method of generating a full RTL description. The method of FIG. 1 has greater predictability and substantially reduces the time for generation of a full RTL generation that satisfies timing and area constraints. The method of FIG. 1 is less computationally intensive. The full RTL description may be generated only once, without modification. Instead of taking hours to generate, a full RTL description can be generated in a short period of time, for example minutes.

Although the method of FIG. 1 is not limited to any particular intellectual properties (IP) block, it is especially useful for configurable pipeline component. The following paragraphs will describe examples of a configurable pipeline component, and examples of a computing platform and a computer-implemented method for generating an optimized pipeline configuration.

Figure 2:
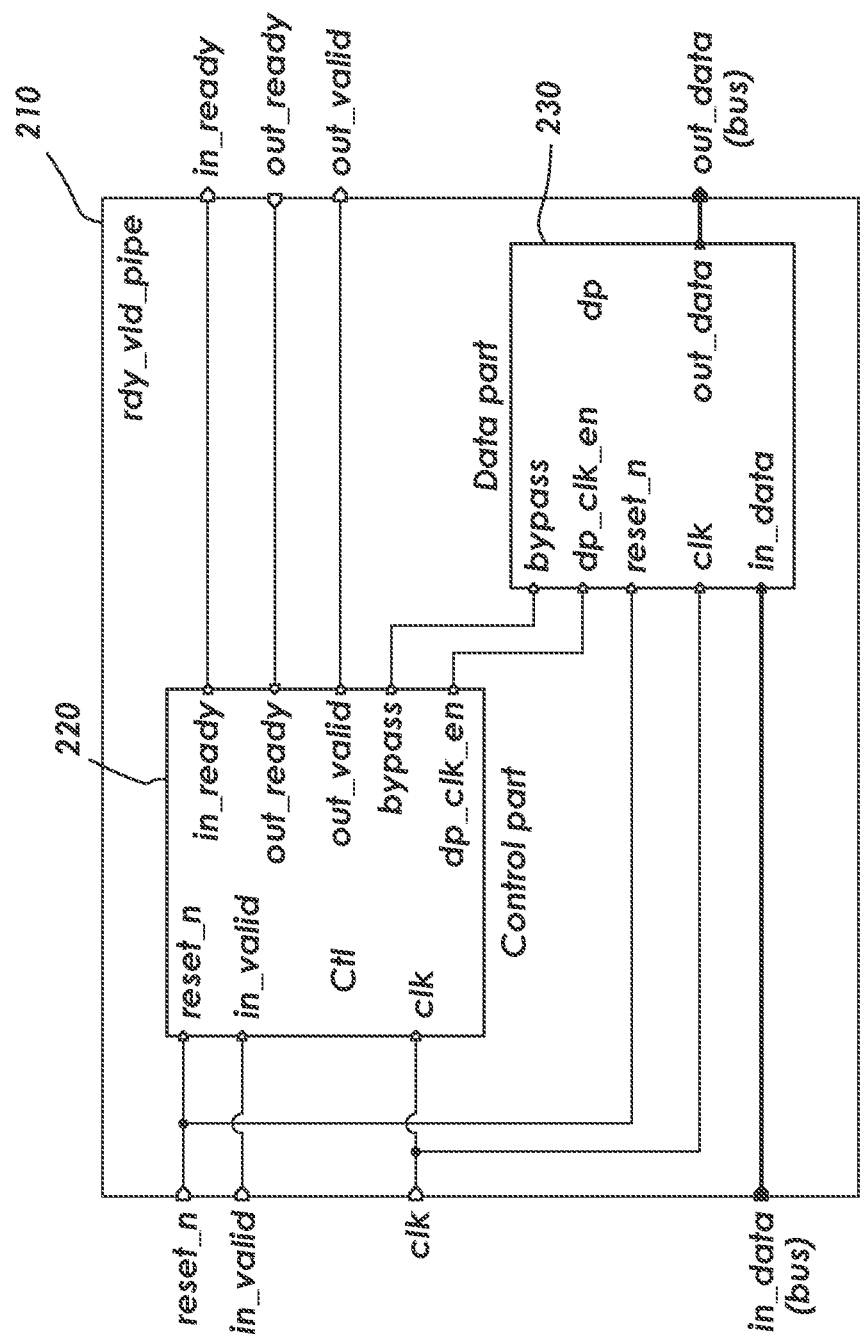
FIG. 2 shows a configurable pipeline component in accordance with the various aspects and embodiment of the invention.

Reference is now made to FIG. 2, which illustrates an example of an architecture of a configurable pipeline component 210. The component 210 includes a control part (Ctl) 220 and a data part (dp) 230. Certain signals associated with the pipeline component 210 will now be described in connection with its configuration modes.

Figure 3:
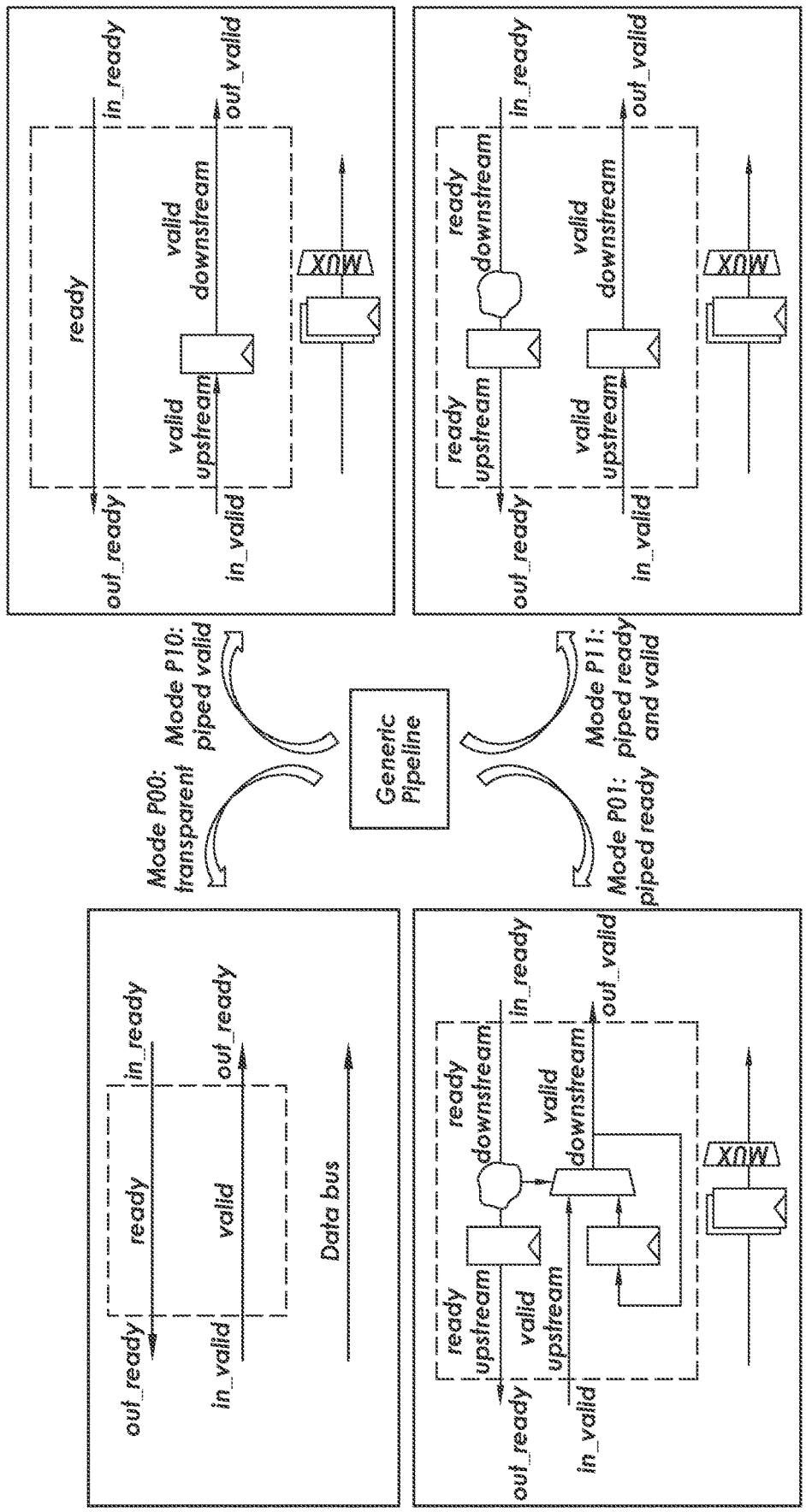
FIG. 3 shows a configurable pipeline component in accordance with the various aspects and embodiment of the invention.

Additional reference is made to FIG. 3, which illustrates an example of different configuration modes of the pipeline component 210. This particular example shows four modes: P00, P01, P10, and P11.

Mode P00 reflects the transparent or "disabled" mode of the pipeline component 210. There are timing paths between out_ready and in_ready and between in_valid and out_valid. No timing path is ending or originating inside the pipeline component. Mode P00 has no logic cost.

Mode P01 has a timing path between out_valid and in_valid, but no timing path between in_ready and out_ready. All timing paths entering from the in_ready end inside the pipeline module. All timing paths originating from out_ready start inside the pipeline component.

Mode P10 has no timing path between out_valid and in_valid. However, it has a timing path between in_ready and out_ready.

Mode P11 reflects the fully enabled mode. Mode P11 has no timing paths between out_ready and in_ready and no timing paths between in_valid and out_valid. Mode P11 has the highest logic cost.

The pipeline component 210 may be characterized for each of the modes of configuration by lookup tables (LUTs). For each mode, the paths between output ports and registers, input ports to registers and between inputs and outputs are described. In accordance with the various aspects and embodiment of the invention, the configurable pipeline element 210 has the same port interface regardless of its mode. In accordance with some aspect and embodiments of the invention, it is critical for the relaxation-based algorithm to have the same port interface for pipeline instances to prevent having to re-synthesize the design every time different implementation mode for the pipeline is tried.

In the LUTs, the modes are preferably sorted in descending order of the number of registers used. Mode P11 is the mode with the most registers enabled, so it is considered first. Mode P00 is the mode with the least registers enabled, so it is considered last. This ordering is referred to as the "order of relaxation." For instance, the modes of FIG. 3 will be considered in the following order: Mode P11▶ Mode P01 ▶Mode P10▶ Mode P00. Starting with mode P11 and moving towards mode P00 will be referred to as "progressive relaxation."

Figure 4A:
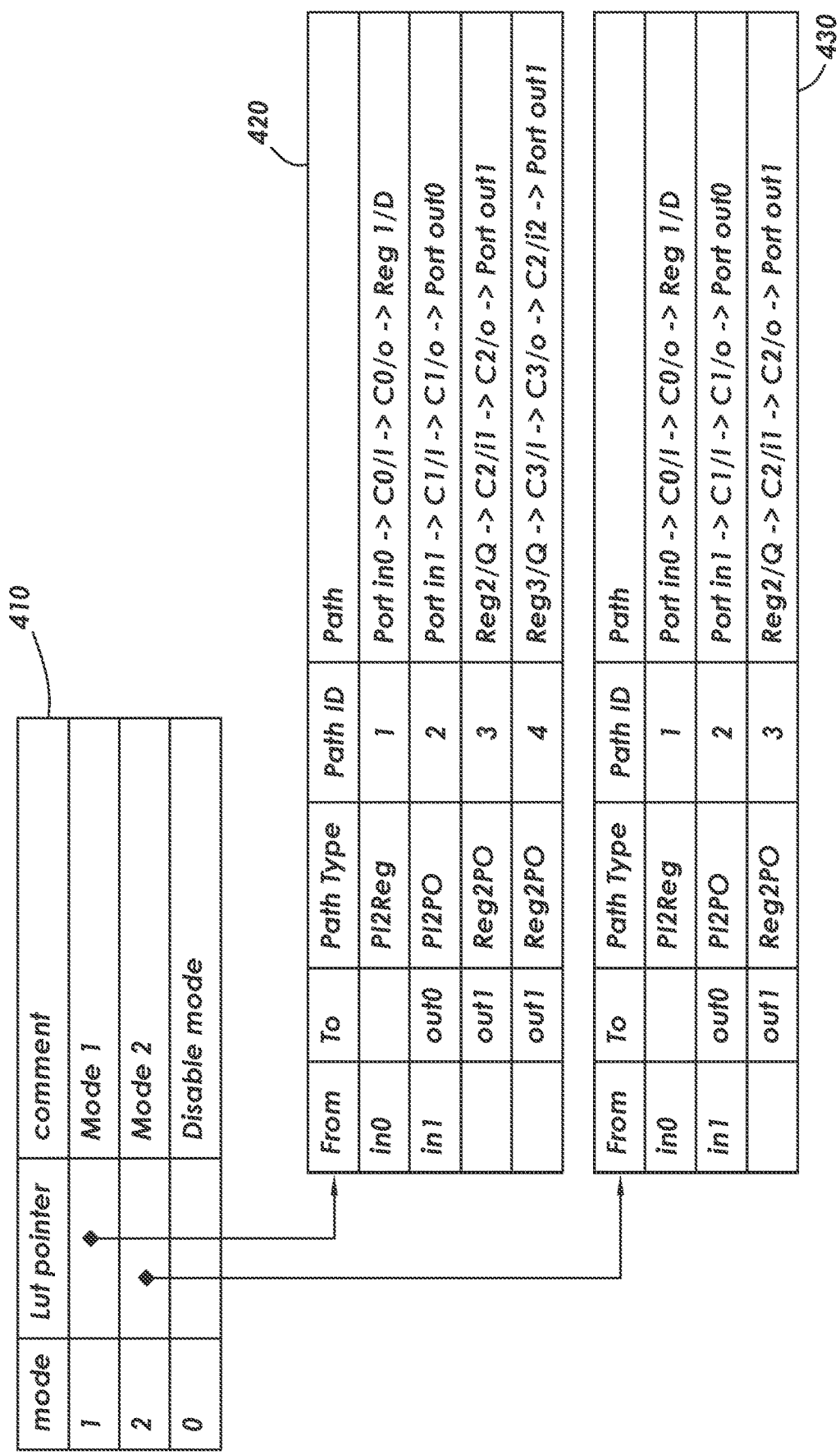
FIG. 4A shows table for a configurable pipeline component in accordance with the various aspects and embodiment of the invention

Reference is now made to FIG. 4A, which illustrates LUTs 410, 420 and 430 that characterize an example of a pipeline component having three modes: Disable, Mode 1 and Mode 2 in accordance with the various aspects and embodiment of the invention. Each path in each LUT 410, 420 and 430 is described in terms of registers and combinational logic. Path type represent the type of timing path. In accordance with some aspect and embodiments of the invention, there are multiple types of paths: 1) Pi2Po is a path directly between an input port to an output port; 2) Pi2Reg is a path between an input port to a register; and 3) Reg2Po is path from a register to an output port. The information in LUT 420 is there for documentation/reporting purpose. It is not required in the search algorithm.

Figure 4B:
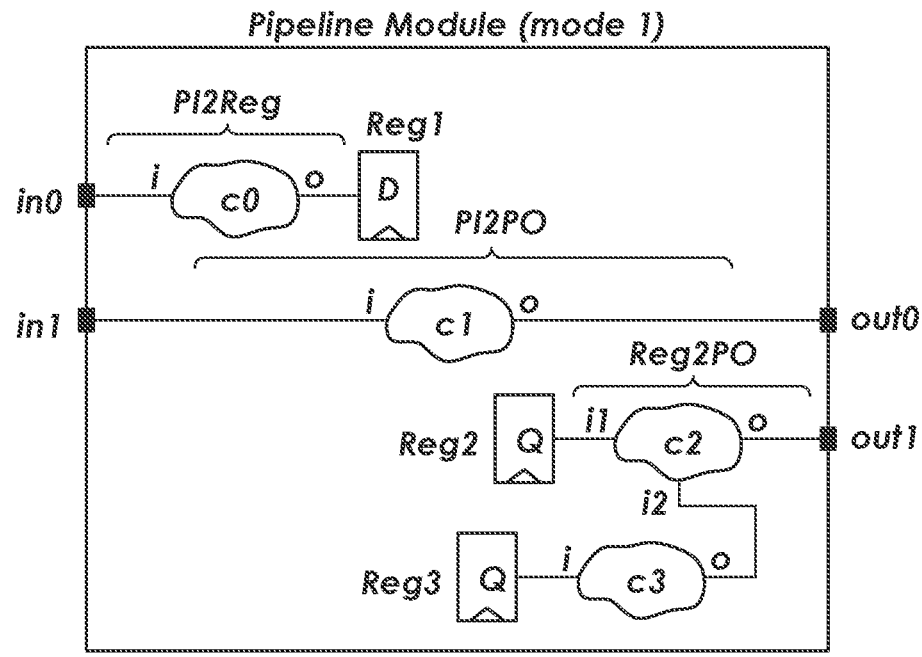
FIG. 4B shows a configurable pipeline component in accordance with the various aspects and embodiment of the invention
Figure 4C:
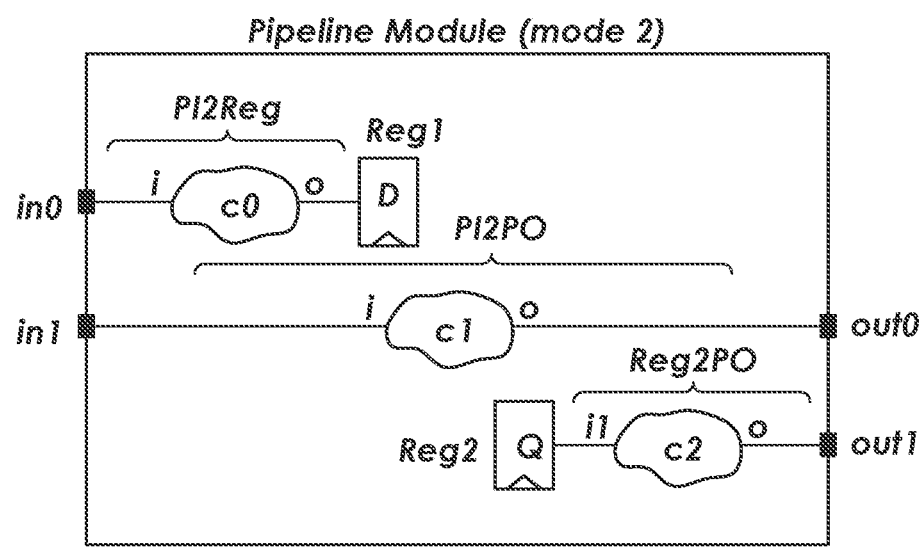
FIG. 4C shows a configurable pipeline component in accordance with the various aspects and embodiment of the invention.

Reference is now made to FIGS. 4B and 4C. FIG. 4B illustrates the pipeline component configured in Mode 1 in accordance with the various aspects and embodiment of the invention. Three registers (Reg1, Reg2 and Reg3) are utilized. FIG. 4C illustrates the pipeline component configured in Mode 2 in accordance with the various aspects and embodiment of the invention. Two registers are utilized. Disable (not illustrated) utilizes the least (zero) registers, and Mode 1 utilizes the most registers. Therefore, the order of relaxation is Mode1▶ Mode 2▶Disable.

Figure 5:
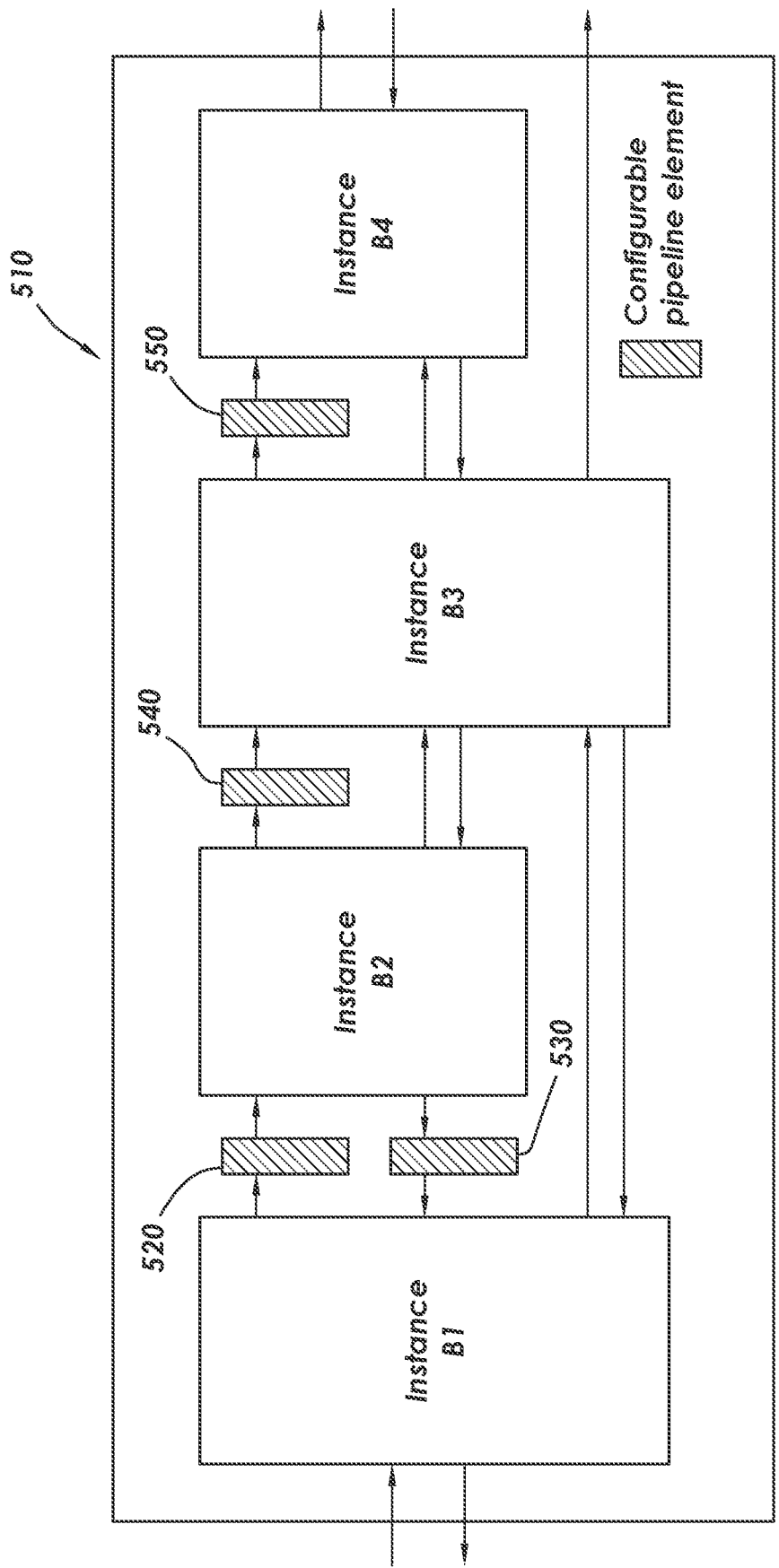
FIG. 5 shows a system utilizing several configurable pipeline components in accordance with the various aspects and embodiment of the invention.

Referring now to FIG. 5, which illustrates a system 510 including a plurality of configurable pipeline components 520, 530, 540 and 550 between block instances B1, B2, B3 and B4. In accordance with some aspect and embodiments of the invention, B1, B2, B3, and B4 are instances of any generic data processing module. FIG. 5 highlights the fact that pipelines might need to be configured between these blocks in order to help the system run at the required frequency.

The pipeline components of FIGS. 2-4C and the system 510 of FIG. 5 are provided merely to facilitate an understanding of the platform and method that follow. Pipeline components with different architectures and modes and LUTs may be utilized.

Figure 6:
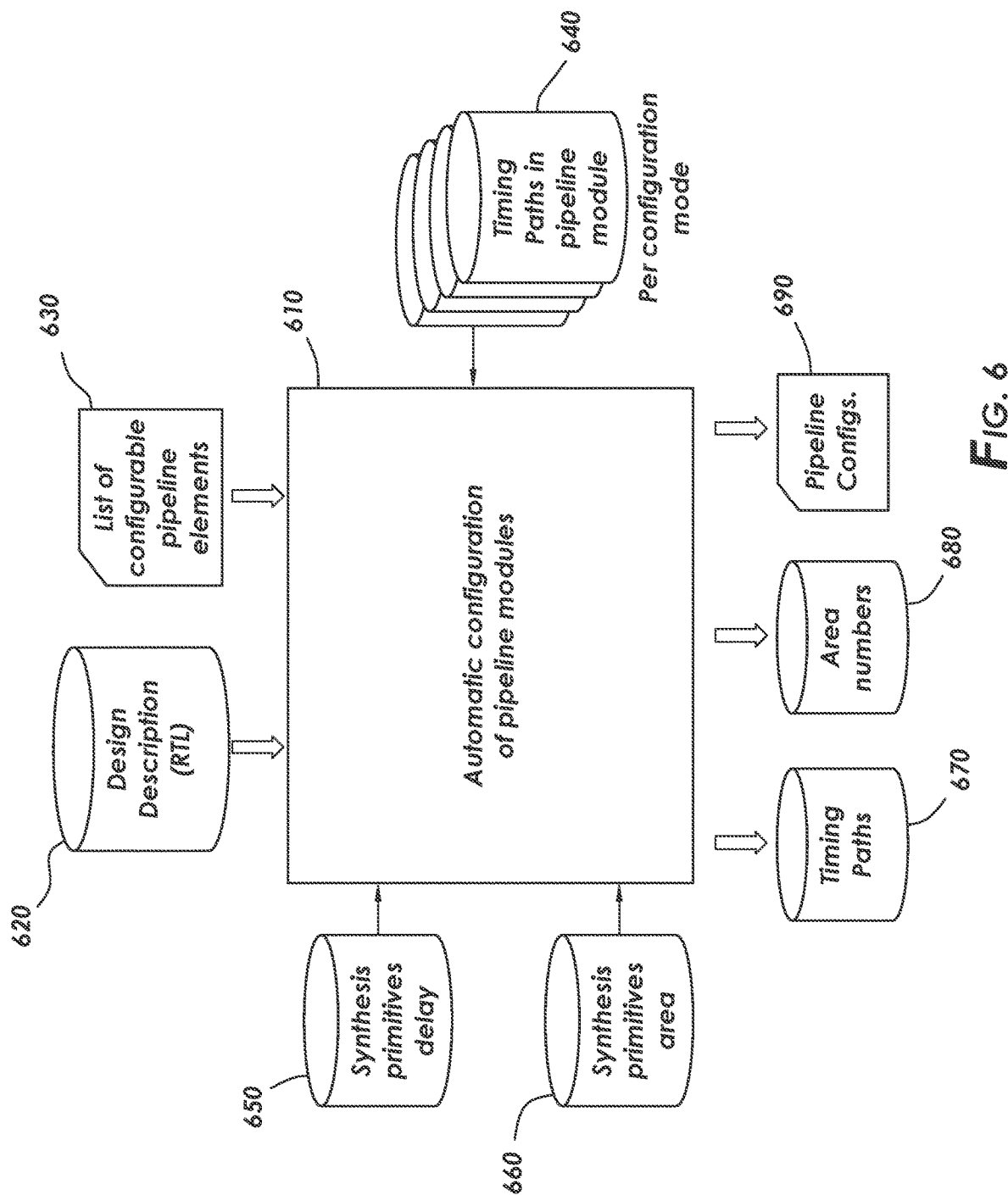
FIG. 6 shows the input data and the produced data for the method of automatic configuration of pipeline modules with the platform of FIG. 9 in accordance with the various aspects and embodiment of the invention.
Figure 7:
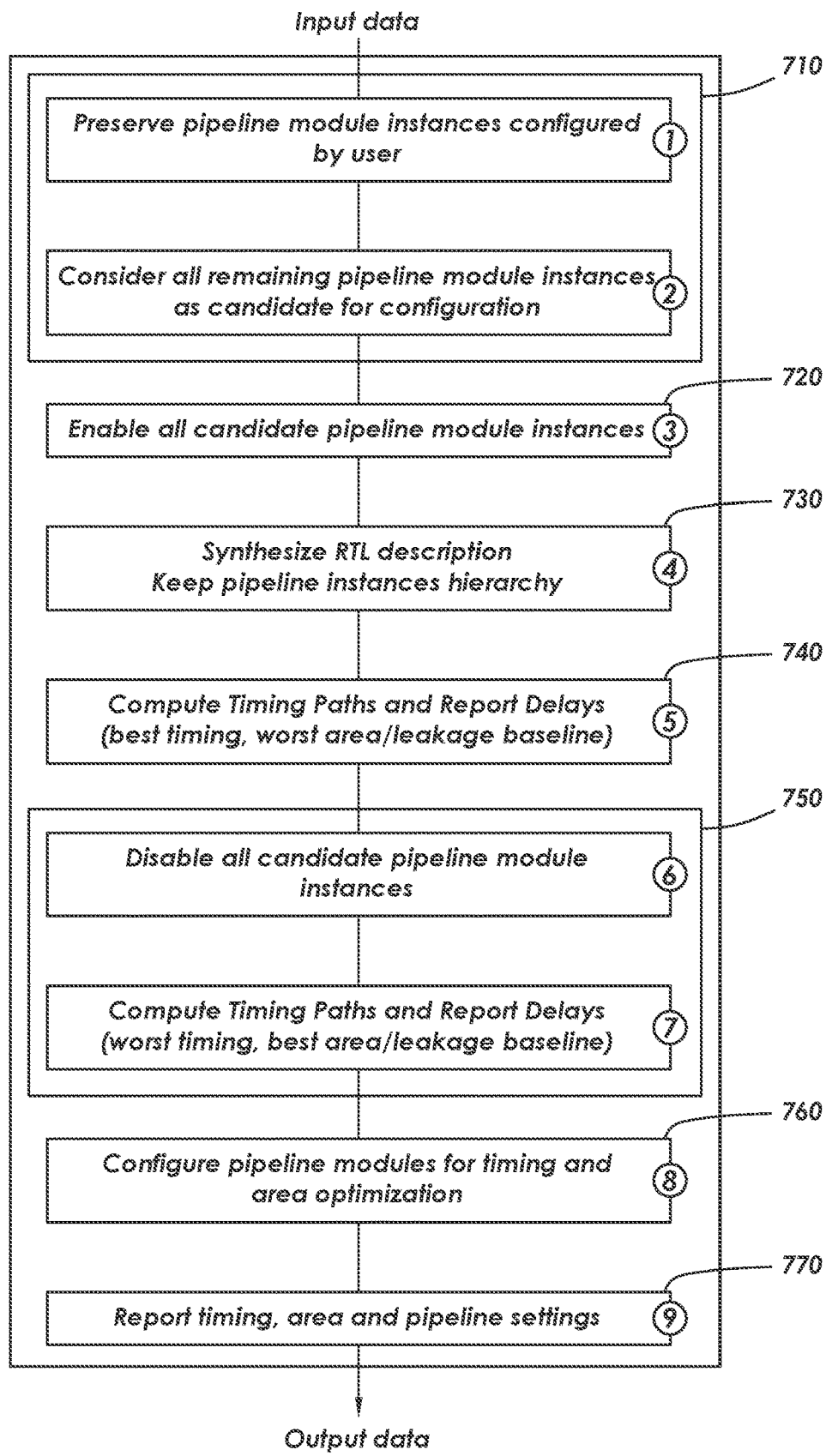
FIG. 7 shows the high-level steps needed by the method of automatic generation of pipeline modules with the platform of FIG. 9 in accordance with the various aspects and embodiment of the invention.

Reference is now made to FIGS. 6 and 7, which illustrate an example of a method using a module 610 of generating an optimized pipeline configuration for an electronics system. A finite set of pipeline configuration options are available for the system.

FIG. 6 illustrates input data that will be processed by the module 610. The input data includes a full RTL description 620 of the design in accordance with the various aspects and embodiment of the invention. The RTL description at the input (block 620) includes all the components in the system being designed before synthesis. The pipeline modules have not been configured yet. Thus, the design description includes all components and have not yet been synthesized, or the pipeline components have not yet been configured.

The input data further include a list 630 of existing configurable pipeline components inside the RTL design, with their names and position inside the design, as well as their parameters used to configure them, and for each, the existing parameters' values. In accordance with some aspect and embodiments of the invention, the list of configurable pipeline elements (block 630) refers to the pipeline modules and their instantiations in the system being designed. Configurable pipeline components are instantiated as modules inside the RTL description.

The input data further include logical operations and timing path information 640 for each configuration mode in accordance with the various aspects and embodiment of the invention. This information may be supplied by the LUTs, which sort the configuration modes by their order of relaxation.

The input data further include synthesis primitives 650 and 660 for delay and area. These synthesis primitives include a basic set, such as logic gates and flip-flops. These primitives will be mapped into the RTL description to compute area and delay.

FIG. 6 further illustrates output data produced by the module 610. The output data includes reports 670 related to timing paths based on combinational delay paths extracted between IOs, IOs and registers, and between registers. In accordance with some aspect and embodiments of the invention, the report 670 provides the assessed timing paths after all pipelines have been configured.

The delays are synthesized for those delays through logic primitives, and not for wires connecting them in accordance with the various aspects and embodiment of the invention. This greatly simplifies the logic synthesis process because there is no need for physical information about how components are placed on the system. The output data further includes reports 680 of area numbers per cell instance bases. In accordance with some aspect and embodiments of the invention, a cell instance base refers to primitive cell, and includes how many instances there are in the design, like how many gates, muxes, registers, etc. since a final synthesis with optimization has not been done at this stage; only report area numbers in term of primitive instances (primitive cells).

The output data further includes Finally, and most importantly, a report 690 of all configured pipeline components. The report 690 contains, for each configurable pipeline component, the value of each of its configuration parameters. The information in this report 690 will be used to generate the full RTL description.

Additional reference is made to FIG. 7, which illustrates an example of a method of generating an optimized pipeline configuration. At step 710, a user option is provided to select all pipelines components that will be considered for configuration. Not all configurable pipeline components might be configured. For instance, a user may wish to preserve user-explicit configurations of pipeline components. This allows users to implement their own ideas about configuration space, such as re-using blocks from previous versions of a system. As another instance, certain pipeline components might be optional, and some of those optional components might not be selected. All selected pipeline components will be considered for configuration At step 720, all pipeline components considered for configuration are fully enabled in accordance with the various aspects and embodiment of the invention. A configurable pipeline component is considered fully enabled when it is configured in the mode having the most registers. A fully enabled pipeline component achieves the best timing, but utilizes the most area.

At block 730, a baseline RTL description with the fully enabled pipelines is synthesized to produce a set of flow paths that achieves best timing but utilizes maximum area. The synthesis process involves mapping the RTL representation onto basic primitive cells including logic gates and registers. It produces a netlist of connected instances of those primitive cells that is then used by our method for configuration of pipelines and related timing and area assessment. A large library of full logic primitives may be used and exact synthesis may be performed. However, it has been found that the use of a small basic logic primitives reduces processing time significantly, yet produces accurate results. Technology libraries that are used by synthesis tools could contain thousands of cells of different types, sizes in term of transistors, drive strengths, power consumptions, etc. Hence, the synthesis mapping and optimization could take hours to map RTL to proper gate-level representations. In accordance with some aspect and embodiments of the invention, the process uses a very small set of cells namely inverters, AND-gates, OR-gates, Muxes and registers, with no variations as optimization is not needed. The various aspects of the invention simply need quick mapping onto this small set for fast assessment of area and timing, which is needed for pipeline configuration.

At block 740, path and area delays are computed from the synthesized RTL using primitives 650 and 660. This step gives the baseline for the best timing, but worst area and leakage because the pipelines are configured with the most registers modes. At block 750, the worst timing impact, but best area is determined for the whole design. This may be done by disabling the pipeline components under consideration. If all paths still satisfy the timing constraints, then a pipeline configuration has been found, with all pipeline components disabled In accordance with some aspect and embodiments of the invention, step 750 refers to a baseline where all timing paths meet the required frequency in the case of all pipeline modules are "disabled." This is a corner case that might not happen in practice, yet it is worth checking. In accordance with some aspect and embodiments of the invention, the process executes step 760 if 750 is not invoked at all. In accordance with some aspect and embodiments of the invention, the process executes step 760 if step 750, after disabling all pipeline modules, does not successfully meet timing requirements.

Figure 8:
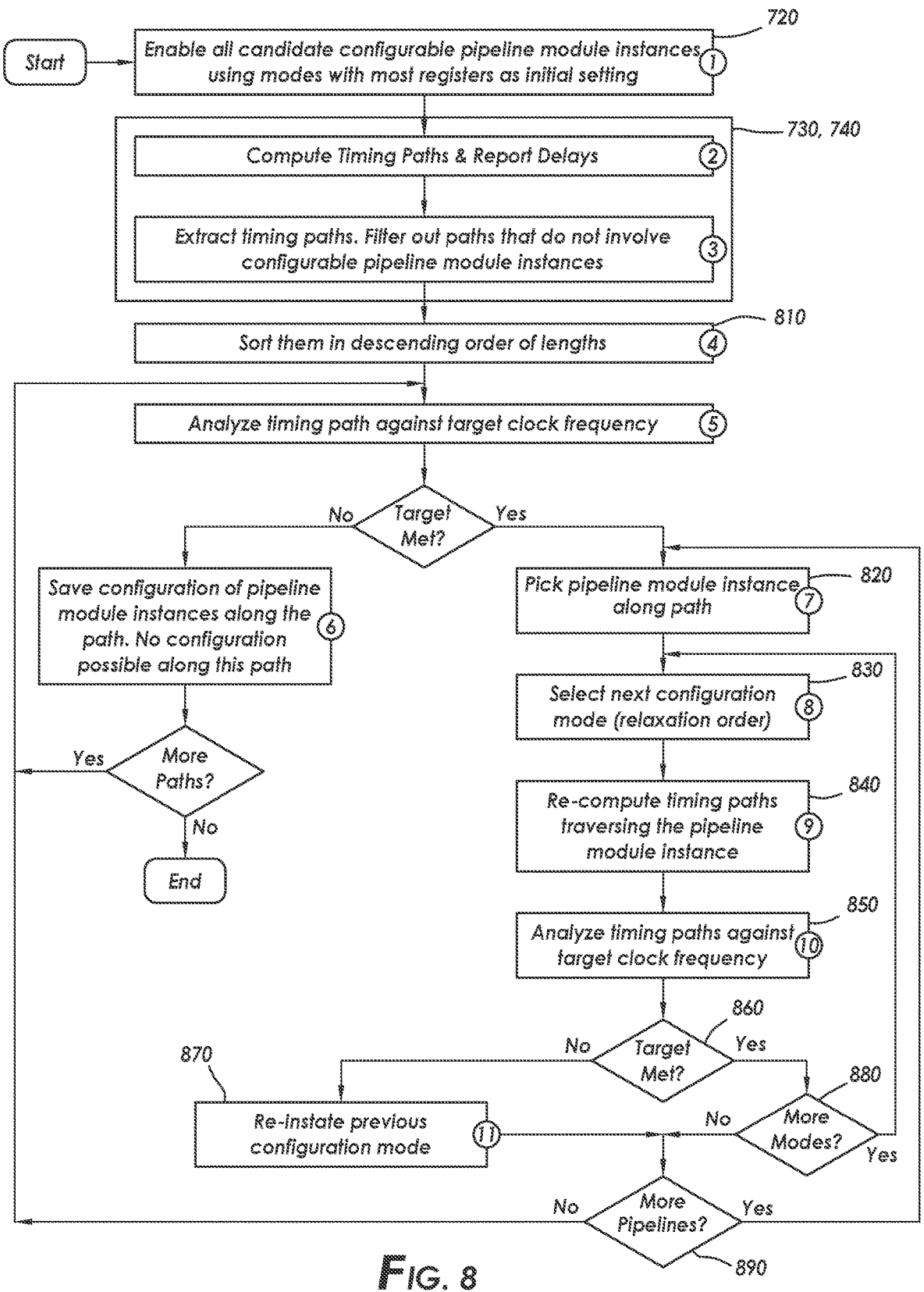
FIG. 8 shows an example of a method of iteratively modifying flow paths to find an optimized pipeline configuration in accordance with the various aspects and embodiment of the invention.

In accordance with some aspect and embodiments of the invention, the processing in step 760 is detailed in FIG. 8 and starts by enabling all pipeline modules. At step 760, if the timing constraints have not been satisfied, then the valid flow paths in the baseline RTL description are iteratively modified until an optimized pipeline configuration is found in accordance with the various aspects and embodiment of the invention. In general, iteratively modifying the valid flow paths involves reducing an overall number of registers while still satisfying timing constraints. With each iteration, the number of registers is further reduced, and the area is further reduced (but the timing is increased). An example of such iterative modification is illustrated in FIG. 8. The modifications may be performed progressively in accordance with the various aspects and embodiment of the invention. That is, the modifications are performed in the order of relaxation.

At step 770, the configured pipeline settings are reported. These settings will be used in the generation of the full RTL description, which refers to the final RTL description where all pipeline module instances have been configured. Area and timing are also reported in accordance with the various aspects and embodiment of the invention. This is related to blocks 670 and 680 where reporting timing and area impact after all pipelines have been configured. This collateral result gives a point of reference that could be useful for a designer to know.

FIG. 8 illustrates an example of a method of iteratively modifying flow paths to find an optimized pipeline configuration in accordance with the various aspects and embodiment of the invention. After step 740 has been completed, the flow paths are sorted into descending order of their timing length (step 810). Analysis of each path is then performed in descending order as follows.

At steps 820 and 830, a pipeline component instance is selected, and a more relaxed configuration mode for the instance is selected. At steps 840 and 850, timing paths traversing the selected instance are recomputed, and analyzed against a timing constraint.

If the constraint is violated (step 860), the previous less relaxed configuration mode is selected for the selected instance (step 870), and the next pipeline instance in descending timing length order is selected (step 820).

If the selected configuration mode does not violate the target frequency (step 860), and if there is a more relaxed configuration mode (step 880), the next configuration mode for that instance is selected (step 830).

If there is not a more relaxed configuration mode for the selected instance (step 880), but there are more pipeline instances to consider (step 890), then another pipeline instance is selected (step 820).

If there are no more pipeline instances to be considered (block 890), then the search picks the next timing path to work on. When all timing paths have been processed (all pipelines along those paths configured) then the final pipeline configuration is reported (step 770).

Figure 9:
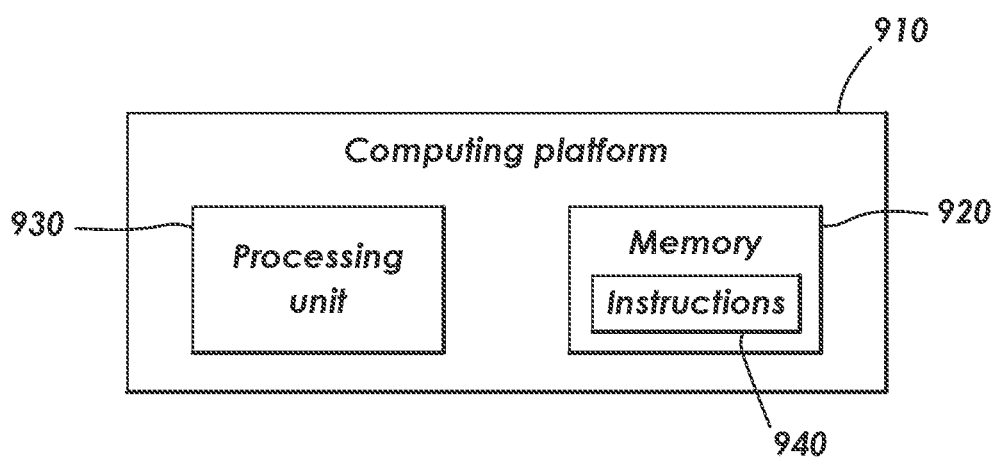
FIG. 9 shows components of the computing platform in accordance with the various aspects and embodiment of the invention.

Reference is now made to FIG. 9, which illustrates an example of components of a computing platform 910 for performing a method herein. The computing platform 910 includes memory 920 and a processing unit 930. The memory 920 stores instructions 940 that, when executed, cause the processing unit 620 to generate the optimized pipeline configuration and optionally the full RTL description with the optimized pipeline configuration. Examples of the computing platform 910 include, but are not limited to workstations, laptops (Windows, MacOS) Servers, and cloud computing The method and platform disclosed herein are not limited to any particular electronics system. Examples of possible systems include, but are not limited to, any electronic system that is made of reconfigurable pipeline components.

Figure 10:
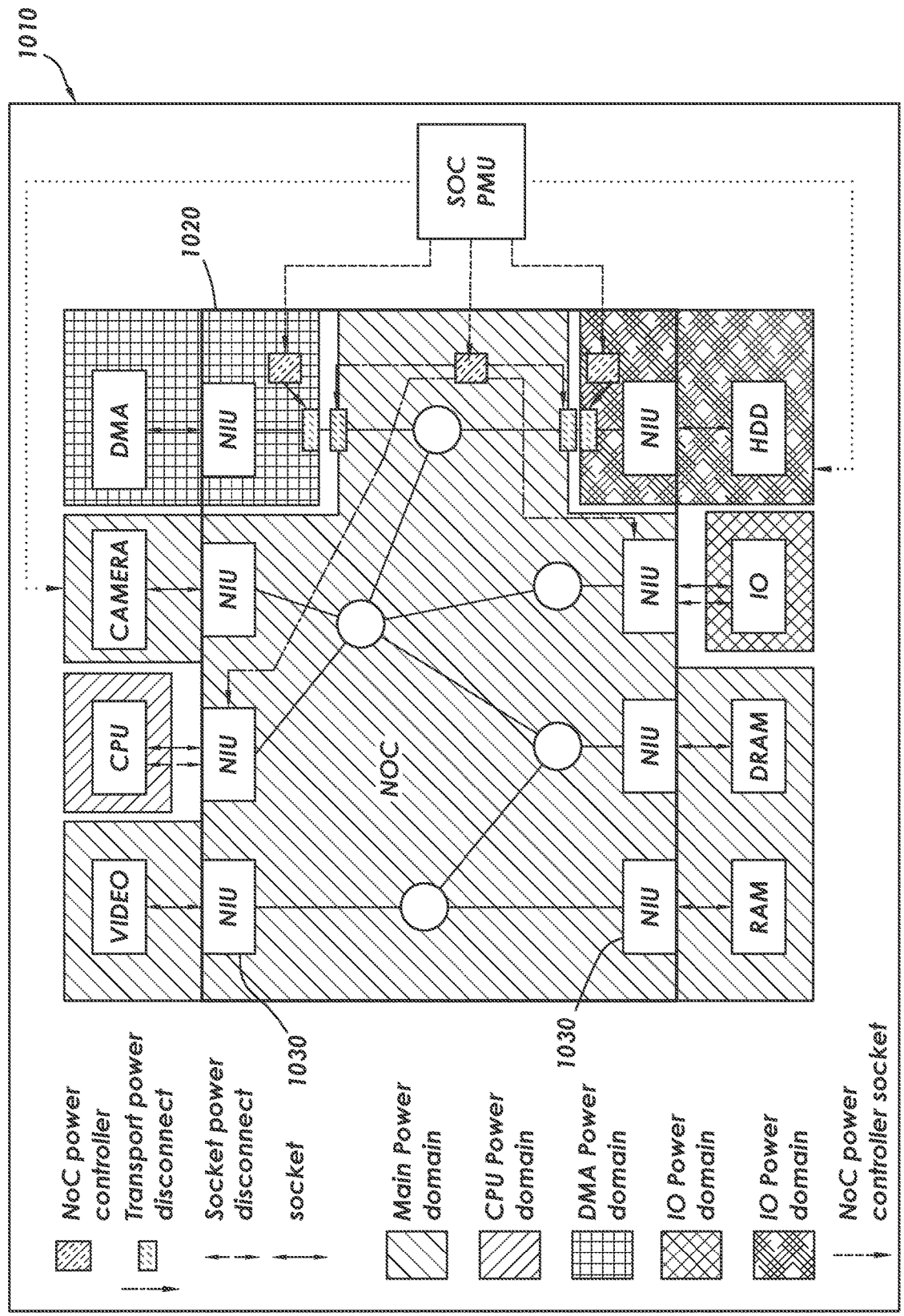
FIG. 10 shows network-on-chip (NoC) having pipeline components configured in accordance with the various aspects and embodiment of the invention.

Consider the example of an SoC 1010 including a NoC 1020 as illustrated in FIG. 10 in accordance with the various aspects and embodiment of the invention. The SoC includes a plurality of initiators and targets, such as video, central processing unit (CPU), camera, direct memory access (DMA), random access memory (RAM), dynamic random access memory (DRAM), input/output (IO), and hard disk drive (HDD). The NoC 1020 provides packet-based communication between the initiators and targets.

The NoC 1020 of FIG. 10 includes network interface units (NIUs) 1030, which are responsible for translating several supported protocols and data sizes to and from the packet transport architecture. The NoC further includes switches, width adapters, firewalls, clock adapters, and individual pipeline registers. These components are parameterized to allow creation of different network topologies (mesh, ring, etc.), accommodate data width and packet styles, and Enable/disable specific features based on user requirements. Configurable pipeline components are available as individual blocks and in many places within the NIU units. The parametrizable and configurable pipeline components of the NoC 1020 may be configured according to a method herein.

Figure 11:
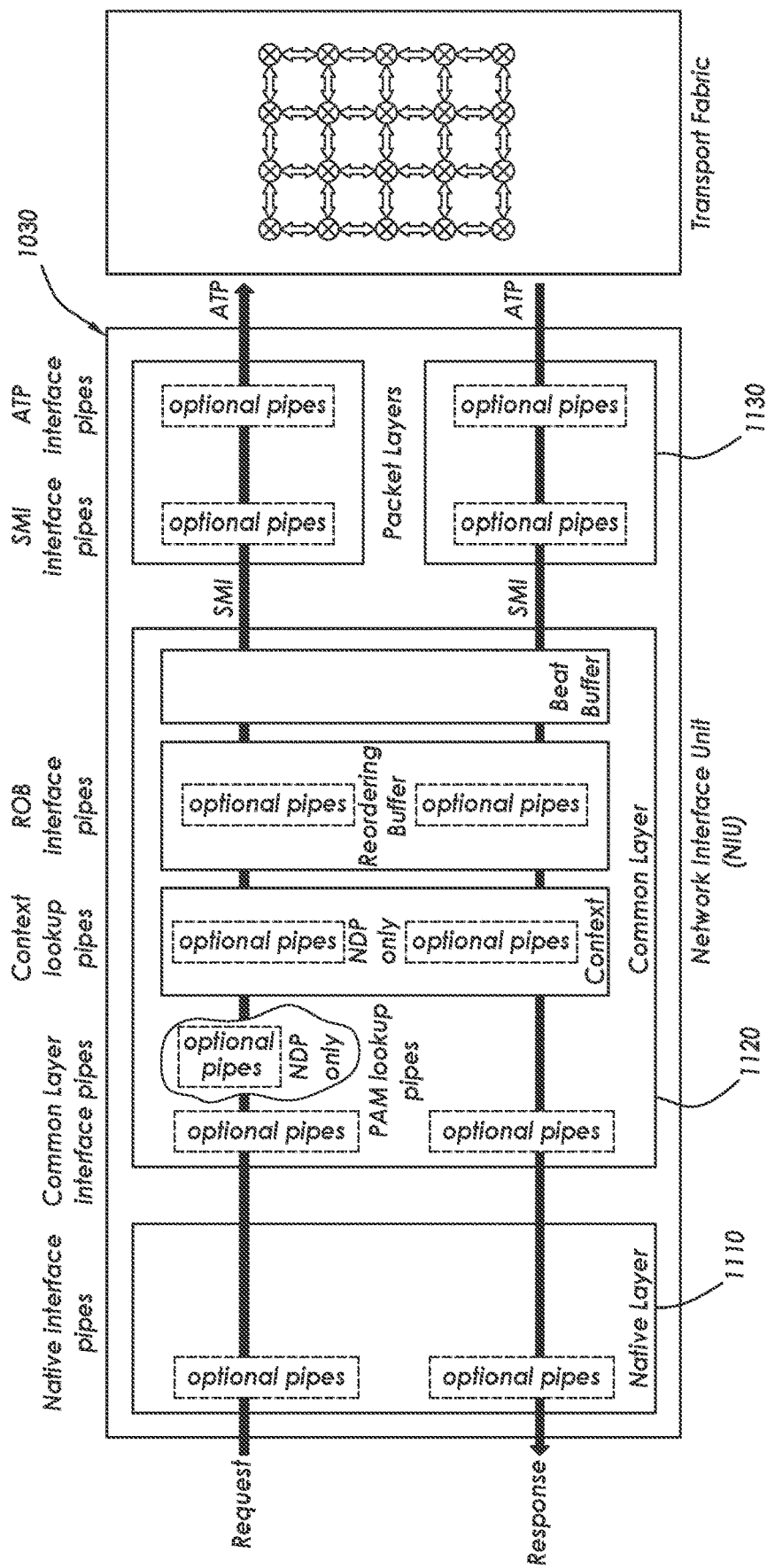
FIG. 11 shows a NoC having pipeline components configured in accordance with the various aspects and embodiment of the invention.

Reference is made to FIG. 11, which illustrates an example of a layered NIU 1030 having multiple pipeline components in accordance with some aspect and embodiments of the invention. The pipeline components are used in a native layer 1110, a common layer 1120, and packet layers 1130. In accordance with some aspect and embodiments of the invention, the common layer 1120 includes a Partial Address Map (PAM) that defines the address space for NIU initiator, in term of which target NIU it talks to, and other relevant routing information. Each of these pipeline components may be configured according to a method herein.

Embodiments in accordance with the invention may be embodied as an apparatus, method, or computer program product. Accordingly, the invention may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the invention may take the form of a computer program product embodied in any tangible medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the invention may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections, such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

It will be appreciated by those skilled in the art that other various modifications could be made to the device without parting from the spirit and scope of this invention (especially various programmable features). All such modifications and changes fall within the scope of the claims and are intended to be covered thereby. Furthermore, practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "couple" or "communicatively coupled" have an effectual relationship realizable by a direction connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-field protocols, or radio frequency identification (RFID).

All illustrations of the drawings are for the purpose of describing selected versions of the invention and are not intended to limit the scope of the invention. The scope of the invention, therefore, is not intended to be limited to the exemplary embodiments shown and described herein. Rather, the scope and spirit of the invention is embodied by the claims.

What is claimed is:

1. A method of generating a full register-transfer level (RTL) description of an electronic system, the method comprising:
generating an optimized pipeline configuration from inputs including a database of RTL elements and a list of configurable pipeline components, wherein generating the configuration includes performing a search for a configuration that optimizes area and timing; and generating the full RTL description with the pipeline components configured according to the optimized pipeline configuration.

2. The method of claim 1, wherein the list of configurable pipeline elements identifies different configuration modes for each of the pipeline elements; and wherein the inputs further include timing path information for each configuration mode.

3. The method of claim 2, wherein performing the search includes:

generating a baseline RTL description with the pipelines configured as fully enabled so as to produce a set of flow paths having best timing;

eliminating flow paths, which are selected from the set of flow paths, in the description that do not satisfy timing constraints; and iteratively modifying valid flow paths in the baseline RTL description until an optimized pipeline configuration is found.

4. The method of claim 3, wherein the baseline RTL description is generated from a library of basic logic primitives and flow path delays and pipeline areas are synthesized by mapping the baseline RTL description onto logic synthesis primitives.

5. The method of claim 4, wherein the flow path delays account for delays through logic primitives.

6. The method of claim 4, wherein iteratively modifying includes modifying the valid flow paths by progressive relaxation of the configurations, wherein all of the pipeline components that are fully enabled are least relaxed and all of the pipeline components fully disabled are most relaxed.

7. The method of claim 3, wherein generating the baseline RTL description includes preserving user-explicit configurations of pipeline components and configuring those remaining pipeline components.

8. The method of claim 3, wherein iteratively modifying the valid flow paths involves reducing an overall number of registers but still satisfying timing constraints.

9. The method of claim 8, wherein a target parameter includes frequency and wherein modifying flow paths by progressive relaxation includes:

sorting the paths into descending order of their timing length; and selecting each of the paths for analysis, starting with the path having a longest timing length, wherein the analysis for each selected path includes:

analyzing the selected path against a target clock frequency, if the selected path does not violate the target clock frequency, then loop through instances of pipeline components along the selected path by:

selecting a pipeline component instance;

selecting a more relaxed configuration mode for the selected instance;

re-computing timing paths traversing the selected instance, re-instating, if the selected path violates the target clock frequency, a previous less relaxed configuration mode; and saving, if the selected configuration mode does not violate the target clock frequency and if there is a more relaxed configuration mode, the selected instance.

10. The method of claim 1, wherein the electronics system includes a network-on-chip (NoC), wherein at least some of the configurable pipeline components are associated with the NoC and the full RTL description includes NoC pipelines that are configured according to the optimized configuration.

11. A computer-implemented method of generating an optimized pipeline configuration for an electronics system, the method comprising:

accessing a database of register-transfer level (RTL) elements, a list of configurable pipeline components for the electronics system, and timing path information and timing constraints for each configuration mode of each configurable pipeline component;

generating a baseline RTL description of the system from the RTL elements with all of the configurable pipeline components fully enabled;

eliminating flow paths in the description that do not satisfy timing constraints; and iteratively modifying configurations of the pipeline components in those valid flow paths in order of relaxation until an optimized pipeline configuration is found.

12. The method of claim 11, wherein timing is optimized with respect to area.

13. The method of claim 11, wherein iteratively modifying includes modifying the valid flow paths by progressive relaxation of the configurations until a target parameter has been satisfied, wherein all of the pipeline components that are fully enabled are least relaxed and all of the pipeline components that are fully enabled are most relaxed.

14. The method of claim 11, wherein the electronics system includes a network-on-chip (NoC) and at least some of the configurable pipeline components are associated with the NoC and a full RTL description includes NoC pipelines that are configured according to the optimized configuration.

15. A computing platform comprising a processing unit and memory storing executable instructions that, when executed, cause the processing unit to:

access a database of register-transfer level (RTL) elements, a list of configurable pipeline components for an electronics system, and timing path information and timing constraints for each configuration mode of each configurable pipeline component;

generate a baseline RTL description of the electronics system from the RTL elements with all of the configurable pipeline components fully enabled;

eliminate flow paths in the description that do not satisfy timing constraints; and iteratively modify configurations of the pipeline components in those valid flow paths in order of relaxation until an optimized pipeline configuration is found.

16. The computing platform of claim 15, wherein timing is optimized with respect to area.

17. The computing platform of claim 15, wherein iteratively modifying includes modifying the valid flow paths by progressive relaxation of the configurations until a target parameter has been satisfied, wherein all of the pipeline components that are fully enabled are least relaxed and all of the pipeline components that are fully enabled are most relaxed.

18. The computing platform of claim 15, wherein the electronics system includes a network-on-chip (NoC) and at least some of the configurable pipeline components are associated with the NoC and the description includes NoC pipelines that are configured according to the optimized configuration.

19. The computing platform of claim 15, wherein the executable instructions further cause the computing platform to generate a full RTL description of the electronics system with the pipeline components configured according to the optimized pipeline configuration.

\* \* \* \* \*